United States Patent
Huang et al.

(10) Patent No.: US 12,444,473 B2
(45) Date of Patent: Oct. 14, 2025

(54) SHIFT REGISTER UNIT AND DISPLAY PANEL

(71) Applicants: Chengdu BOE Optoelectronics Technology Co., Ltd., Chengdu (CN); BOE Technology Group Co., Ltd., Beijing (CN)

(72) Inventors: Yao Huang, Beijing (CN); Xilei Cao, Beijing (CN); Zhenhua Zhang, Beijing (CN)

(73) Assignees: CHENGDU BOE OPTOELECTRONICS TECHNOLOGY CO., LTD., Sichuan (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/291,927

(22) PCT Filed: May 20, 2022

(86) PCT No.: PCT/CN2022/094154
§ 371 (c)(1),
(2) Date: Jan. 25, 2024

(87) PCT Pub. No.: WO2023/221102
PCT Pub. Date: Nov. 23, 2023

(65) Prior Publication Data
US 2024/0249786 A1    Jul. 25, 2024

(51) Int. Cl.
*G11C 19/28* (2006.01)
*G09G 3/20* (2006.01)

(52) U.S. Cl.
CPC ............... *G11C 19/28* (2013.01); *G09G 3/20* (2013.01); *G09G 2310/0286* (2013.01)

(58) Field of Classification Search
CPC ........ G11C 19/28; G09G 3/20; G09G 3/3266; G09G 3/3677; G09G 3/3208; G09G 3/36; G09G 2310/0286
See application file for complete search history.

(56) References Cited

U.S. PATENT DOCUMENTS

| 2021/0350739 | A1* | 11/2021 | Hu | G11C 19/28 |
| 2021/0366351 | A1* | 11/2021 | Mi | G11C 19/28 |
| 2021/0366352 | A1* | 11/2021 | Zou | G09G 3/2092 |

FOREIGN PATENT DOCUMENTS

CN     107909959 A * 4/2018

* cited by examiner

*Primary Examiner* — Brent D Castiaux
(74) *Attorney, Agent, or Firm* — XSENSUS LLP (57) ABSTRACT

A shift register unit is provided and includes an input circuit, which is connected to first and second signal input terminals and a first node and receives a first level signal, transmits signal of the first signal input terminal to the first node in response to signal of the first signal input terminal and first level signal to the first node in response to signal of the second signal input terminal; a first control sub-circuit connected to first and second nodes and a clock signal terminal and receiving first level signal, which transmits first level signal to the first node in response to signals of the second node and clock signal terminal; a first output sub-circuit connected to first node, clock signal terminal and signal output terminal, which transmits signal of the clock signal terminal to the signal output terminal in response to signal of the first node.

20 Claims, 4 Drawing Sheets

SHIFT REGISTER UNIT AND DISPLAY PANEL

CROSS-REFERENCE TO RELATED APPLICATION

The present disclosure is a U.S. National Stage of International Application No. PCT/CN2022/094154, filed on May 20, 2022, entitled "SHIFT REGISTER UNIT AND DISPLAY PANEL", the entire content of which is incorporated herein by reference.

TECHNICAL FIELD

The present disclosure relates to a field of display technology, and more particularly to a shift register unit and a display panel.

BACKGROUND

In a display device, a plurality of pixels arranged in an array may be driven by a gate drive circuit. The gate drive circuit scans each row of pixels in a predetermined sequence. In the related art, after the gate drive circuit outputs a drive signal for pixels in a present row, there is a problem of display abnormality caused by output signal drift.

It should be noted that the information disclosed in this section is turned only for enhancing understanding of the BACKGROUND of the disclosure and therefore, may contain information that does not constitute the prior art that is already known to those skilled in the art.

SUMMARY

The present disclosure aims to overcome shortcomings in the prior art and provide a shift register unit and a display panel.

According to a first aspect of the present disclosure, a shift register unit is provided and includes: an input circuit, connected to a first signal input terminal, a second signal input terminal and a first node and receiving a first level signal, where the input circuit is configured to transmit a signal of the first signal input terminal to the first node in response to the signal of the first signal input terminal and transmit the first level signal to the first node in response to a signal of the second signal input terminal; a first control sub-circuit, connected to the first node, a second node and a clock signal terminal and receiving the first level signal, where the first control sub-circuit is configured to transmit the received first level signal to the first node in response to a signal of the second node and a signal of the clock signal terminal; a first output sub-circuit, connected to the first node, the clock signal terminal and a signal output terminal, where the first output sub-circuit transmits the signal of the clock signal terminal to the signal output terminal in response to a signal of the first node.

In an exemplary embodiment of the present disclosure, a level signal of the first node and a level signal of the second node are inverted in phase, and a turn-on level of the first output sub-circuit and a turn-on level of the first control sub-circuit have the same polarity.

In an exemplary embodiment of the present disclosure, the first level signal and a turn-on level signal of the first output sub-circuit have opposite polarities.

In an exemplary embodiment of the present disclosure, the signal of the clock signal terminal is a periodic signal, the first signal input terminal is configured to provide a first input signal, the second signal input terminal is configured to provide a second input signal, and a signal period of the clock signal terminal is less than or equal to a time interval between the first input signal and the second input signal.

In an exemplary embodiment of the present disclosure, the first control sub-circuit includes: a fifteenth transistor, with a control end connected to the clock signal terminal and a first end receiving the first level signal, where the fifteenth transistor is configured to transmit the first level signal to a second end of the fifteenth transistor in response to the signal of the clock signal terminal; a sixteenth transistor, with a control end connected to the second node, a first end connected to the second end of the fifteenth transistor, and a second end connected to the first node, where the sixteenth transistor is configured to transmit the received first level signal to the first node in response to the signal of the second node.

In an exemplary embodiment of the present disclosure, turn-on levels of the fifteenth transistor and the sixteenth transistor have the same polarity.

In an exemplary embodiment of the present disclosure, the fifteenth transistor and the sixteenth transistor are both N-type transistors.

In an exemplary embodiment of the present disclosure, the first output sub-circuit includes: a ninth N-type transistor, with a control end connected to the first node, a first end connected to the clock signal terminal, and a second end connected to the signal output terminal, where the ninth N-type transistor is configured to transmit the signal of the clock signal terminal to the signal output terminal in response to the signal of the first node; a capacitor, with a first electrode connected to the first node, and a second electrode connected to the signal output terminal.

In an exemplary embodiment of the present disclosure, the input circuit includes: a first input sub-circuit, connected to the first signal input terminal and the first node, where the first input sub-circuit is configured to transmit the signal of the first signal input terminal to the first node in response to the signal of the first signal input terminal; a second input sub-circuit, connected to a second signal terminal and the first node and receiving the first level signal, where the second input sub-circuit is configured to transmit the first level signal to the first node in response to a signal of the second signal terminal.

In an exemplary embodiment of the present disclosure, the first input sub-circuit includes: a fourth N-type transistor, with a control end and a first end connected to the first signal input terminal, and a second end connected to a fourth node, where the fourth N-type transistor is configured to transmit the signal of the first signal input terminal to the fourth node in response to the signal of the first signal input terminal; a third N-type transistor, with a control end connected to the first signal input terminal, a first end connected to the fourth node, and a second end connected to the first node, where the third N-type transistor is configured to transmit a signal of the fourth node to the first node in response to the signal of the first signal input terminal; the second input sub-circuit includes: a second N-type transistor, with a control end connected to the second signal input terminal, a first end receiving the first level signal, and a second end connected to the fourth node, where the second N-type transistor is configured to transmit the first level signal to the fourth node in response to the signal of the second signal input terminal; a first N-type transistor, with a control end connected to the second signal input terminal, a first end connected to the fourth node, and a second end connected to the first node, where the first N-type transistor is configured to transmit the signal of the fourth node to the first node in response to the signal of the second signal input terminal.

In an exemplary embodiment of the present disclosure, the shift register unit further includes: a second control sub-circuit, connected to the fourth node and the second node and receiving the first level signal and a second level signal, where the second control sub-circuit is configured to transmit the second level signal to the fourth node when the second node is a non-turned-on level or transmit the first level signal to the fourth node in response to a turn-on level signal of the second node; where the first level signal and the second level signal have opposite polarities.

In an exemplary embodiment of the present disclosure, the second control sub-circuit includes: a seventh N-type transistor, with a control end connected to the second node, a first end receiving the first level signal, and a second end connected to the fourth node, where the seventh N-type transistor is configured to transmit the first level signal to the fourth node in response to the signal of the second node; a sixth N-type transistor, with a control end connected to the second node and a first end connected to the fourth node, where the sixth N-type transistor is configured to output the signal of the fourth node through a second end of the sixth N-type transistor in response to the signal of the second node; a fifth N-type transistor, with a control end connected to the second end of the sixth N-type transistor, a first end receiving the second level signal, and a second end connected to the fourth node, where the fifth N-type transistor is configured to transmit the second level signal to the fourth node when the second node is the non-turned-on level, and stop transmitting the second level signal to the fourth node when the second node is a turn-on level signal.

In an exemplary embodiment of the present disclosure, the shift register unit further includes: a third control sub-circuit, connected to the first node, the second node, the first signal input terminal and receiving the first level signal, where the third control sub-circuit is configured to transmit the first level signal to the second node in response to the signal of the first signal input terminal and the signal of the first node; a fourth control sub-circuit, connected to the first node and the second node and receiving the first level signal and a third level signal, where the fourth control sub-circuit is configured to disconnect the third level signal from the second node in response to the signal of the first node or transmit the third level signal to the second node in response to the third level signal, where the third level signal and the first level signal are inverted in phase.

In an exemplary embodiment of the present disclosure, the third control sub-circuit includes: an eighth N-type transistor, with a control end connected to the first signal input terminal, a first end receiving the first level signal, and a second end connected to the second node, where the eighth N-type transistor is configured to transmit the first level signal to the second node in response to the signal of the first signal input terminal, to reset the second node; an eleventh N-type transistor, with a control end connected to the first node, a first end receiving the first level signal, and a second end connected to the second node, where the eleventh N-type transistor is configured to transmit the first level signal to the second node in response to the signal of the first node, to reset the second node; the fourth control sub-circuit includes: a twelfth N-type transistor, with a control end connected to the first node, a first end receiving the first level signal, a second end connected to a third node, where the twelfth N-type transistor is configured to transmit the first level signal to the third node in response to the signal of the first node; a thirteenth N-type transistor, with a control end and a first end receiving the third level signal, and a second end connected to the third node, where the thirteenth N-type transistor is configured to transmit the third level signal to the third node in response to the third level signal; a fourteenth N-type transistor, with a control end connected to the third node, a first end receiving the third level signal and a second end connected to the second node, where the fourteenth N-type transistor is configured to transmit the third level signal to the second node in response to a signal of the third node.

In an exemplary embodiment of the present disclosure, the shift register unit further includes: a second output sub-circuit, connected to the second node, the signal output terminal and receiving the first level signal, where the second output sub-circuit is configured to transmit the first level signal to the signal output terminal in response to the signal of the second node.

In an exemplary embodiment of the present disclosure, the second output sub-circuit includes: a tenth N-type transistor, with a control end connected to the second node, a first end receiving the first level signal, and a second end connected to the signal output terminal, where the tenth N-type transistor is configured to transmit the first level signal to the signal input terminal in response to the signal of the second node.

According to a second aspect of the present disclosure, a display panel is provided and includes a gate drive circuit, where the gate drive circuit includes a plurality of shift register units cascaded according to any embodiment of the present disclosure.

The shift register unit provided by the present disclosure is provided with the first control sub-circuit, and the first control sub-circuit may transmit the first level signal to the first node in response to the signal of the second node and the signal of the clock signal terminal. During the period that the shift register unit outputs the signal, since the second node maintains a low level, the first control sub-circuit does not output the first level signal, and therefore an output signal of the shift register unit is not affected. In a maintenance stage after the shift register unit outputs the signal, since the second node maintains a high level signal, the first control sub-circuit may periodically transmit the first level signal to the first node under the control of a turned-on level of the second node, to periodically reset the first node, such that the first node maintains the low level. Thus, the problem of unstable operation of the shift register unit, caused by the current leakage of the first node during the signal maintenance stage after the shift register unit outputs the signal, is solved.

It should be understood that the preceding general description and the following detailed description are exemplary and explanatory only and are not restrictive of the present disclosure.

BRIEF DESCRIPTION OF THE DRAWINGS

The accompanying drawings here are incorporated in the specification and constitute a part of this specification, show embodiments in accordance with the present disclosure and serve to explain the principles of the present disclosure together with the specification. Obviously, the drawings in the following description are turned only some embodiments of the present disclosure, and for those ordinary skills in the art, other drawings may also be obtained from these drawings without creative efforts.

DETAILED DESCRIPTION

Example embodiments will now be described more fully with reference to the accompanying drawings. However, the embodiments may be implemented in a variety of forms and should not be construed as being limited to the examples set forth herein. Rather, these embodiments are provided such that the present disclosure will be more complete so as to convey the idea of the exemplary embodiments to those skilled in this art. The same reference numerals in the drawings denote the same or similar parts, and the repeated description thereof will be omitted. In addition, the drawings are merely schematic representations of the present disclosure and are not necessarily drawn to scale.

Figure 1:
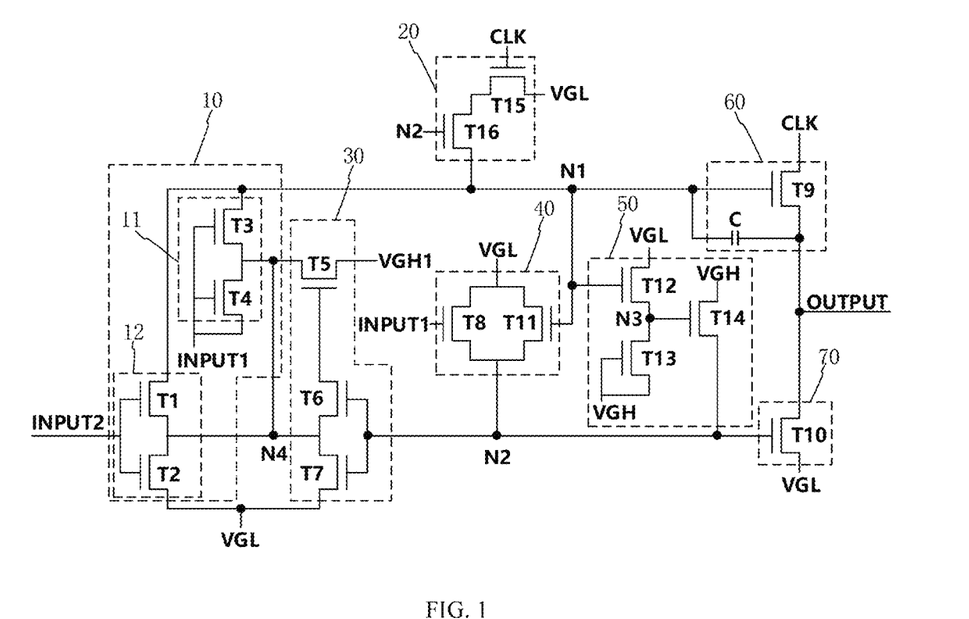
FIG. 1 is a structural diagram of a shift register unit according to an embodiment of the present disclosure.

FIG. 1 is a structural diagram of a shift register unit according to an embodiment of the present disclosure. As shown in FIG. 1, the shift register unit may include an input circuit 10, a first control sub-circuit 20 and a first output sub-circuit 60, where the input circuit 10 is connected to a first signal input terminal INPUT1, a second signal input terminal INPUT2, and a first node N1 and receives a first level signal VGL, the input circuit 10 may transmit a signal of the first signal input terminal INPUT1 to the first node N1 in response to the signal of the first signal input terminal INPUT1 and transmit the first level signal VGL to the first node N1 in response to a signal of the second signal input terminal INPUT2; the first control sub-circuit 20 is connected to the first node N1, a second node N2 and a clock signal terminal CLK and receives the first level signal VGL. The first control sub-circuit 20 may transmit the received first level signal VGL to the first node N1 in response to a signal of the second node N2 and a signal of the clock signal terminal; the first output sub-circuit 60 is connected to the first node N1, the clock signal terminal CLK and a signal output terminal OUTPUT, and the first output sub-circuit 60 transmits the signal of the clock signal terminal to the signal output terminal OUTPUT in response to the signal of the first node N1.

The shift register unit provided by the present disclosure is provided with the first control sub-circuit 20, and the first control sub-circuit 20 may transmit the first level signal VGL to the first node N1 in response to the signal of the second node N2 and the signal of the clock signal terminal. During the period that the shift register unit outputs the signal, since the second node N2 maintains a low level, the first control sub-circuit 20 does not output the first level signal VGL, and therefore an output signal of the shift register unit is not affected. In a maintenance stage after the shift register unit outputs the signal, since the second node N2 maintains a high level signal, the first control sub-circuit may periodically transmit the first level signal VGL to the first node N1 under the control of a turned-on level of the second node N2, to periodically reset the first node N1, such that the first node N1 maintains the low level. Thus, the problem of unstable operation of the shift register unit, caused by the current leakage of the first node N1 during the signal maintenance stage after the shift register unit outputs the signal, is solved.

In the exemplary embodiment, a level signal of the first node N1 and a level signal of the second node N2 are inverted in phase, that is, when the first node N1 is a high level, the second node N2 is a low level; and when the first node N1 is a low level, the second node N2 is a high level. In a stage when the shift register unit performs a shift signal output, the first node N1 is a turned-on level (the turned-on level may be for example the high level), and the first output sub-circuit 60 may be turned on under the control of the turned-on level of the first node N1, and the signal of the signal input terminal is shifted and output, and when the first node N1 is the turned-on level, the second node N2 is a non-turned-on level, such that the first control sub-circuit 20 is turned off without affecting the shift signal output. In the signal maintenance stage after the shift register unit completes the shift signal output, the first node N1 maintains the non-turned-on level, and the second node N2 maintains the turned-on level. During this period, the first control sub-circuit 20 may be controlled, under the control of the turned-on level of the second node N2, to periodically transmit the first level signal VGL (the first level signal VGL is the non-turned-on level signal) to the first node N1 using a periodic clock signal of the clock signal terminal CLK, and the first level signal VGL periodically resets the first node N1. Thus, the first node N1 may maintains a stable potential during the signal maintenance stage of the shift register unit, and the first node N1 may maintain a stable potential, which may control the first output sub-circuit 60 to be turned off, and the first output sub-circuit 60 cannot cause the current leakage problem, so as to solve the problem of the unstable operation of the shift register unit caused by the failure to maintain the potential of the first node N1 in the related art.

As shown in FIG. 1, the shift register unit provided by the present disclosure may include the first signal input terminal INPUT1 and the second signal input terminal INPUT2. In the exemplary embodiment, the input circuit 10 may include the first input sub-circuit 11 and the second input sub-circuit 12, and the first input sub-circuit 11 is connected to the first signal input terminal INPUT1 and the first node N1, The first input sub-circuit 11 may transmit the signal of the first signal input terminal INPUT1 to the first node N1 in response to the signal of the first signal input terminal INPUT1. When the first signal input terminal INPUT1 is the turned-on level, and the first node N1 is the turned-on level, and under the control of the turned-on level of the first node N1, the first output sub-circuit 60 may perform the shift signal output.

The second input sub-circuit 12 is connected to the second signal input terminal INPUT2 and the first node N1 and receives the first level signal VGL. The second input sub-circuit 12 may transmit the first level signal VGL to the first node N1 in response to the signal of the second signal input terminal INPUT2. The first level signal VGL may be a non-turned-on level signal, that is, the first node N1 is set to be the non-turned-on level when the second signal input terminal INPUT2 is the non-turned-on level. Under the control of the non-turned-on level of the first node N1, the first output sub-circuit 60 is turned off. Moreover, thereafter, the first node N1 is periodically written to the non-turned-on level by the first control sub-circuit 20, and thus the first node N1 may maintain the non-turned-on level and control the first output sub-circuit 60 to maintain the turned-off state without incurring the current leakage problem.

As shown in FIG. 1, in the exemplary embodiment, each of the first input sub-circuit 11, the second input sub-circuit 12, the first control sub-circuit 20 and the first output sub-circuit 60 may all be implemented through a transistor.

For example, the first input sub-circuit 11 may include a third N-type transistor T3 and a fourth N-type transistor T4, a control end and a first end of the fourth N-type transistor T4 are connected to the first signal input terminal INPUT1, a second end of the fourth N-type transistor T4 is connected to a fourth node N4, and the fourth N-type transistor T4 may transmit the signal of the first signal input terminal INPUT1 to the fourth node N4 in response to the signal of the first signal input terminal INPUT1. A control end of the third N-type transistor T3 is connected to the first signal input terminal INPUT1, a first end of the third N-type transistor T3 is connected to the fourth node N4, a second end of the third N-type transistor T3 is connected to the first node N1, and the third N-type transistor T3 may transmit the signal of the fourth node N4 to the first node N1 in response to the signal of the first signal input terminal INPUT1. When the first signal input terminal INPUT1 is the high level, the fourth N-type transistor T4 and the third N-type transistor T3 are turned on, and the high level signal of the first signal input terminal INPUT1 is transmitted to the first node N1. It should be understood that in other embodiments, the first input sub-circuit 11 may also be implemented by another circuit structure.

For example, the second input sub-circuit 12 may include the first N-type transistor T1 and the second N-type transistor T2, a control end of the second N-type transistor T2 is connected to the second signal input terminal INPUT2, a first end of the second N-type transistor T2 receives the first level signal VGL, and a second end of the second N-type transistor T2 is connected to the fourth node N4, the second N-type transistor T2 may transmit the first level signal VGL to the fourth node N4 in response to the signal of the second signal input terminal INPUT2. A control end of the first N-type transistor T1 is connected to the second signal input terminal INPUT2, a first end of the first N-type transistor T1 is connected to the fourth node N4, a second end of the first N-type transistor T1 is connected to the first node N1, and the first N-type transistor T1 may transmit the signal of the fourth node N4 to the first node N1 in response to the signal of the second signal input terminal INPUT2. When the second signal input terminal INPUT2 is the high level, the first N-type transistor T1 and the second N-type transistor T2 are turned on to transmit the first level signal VGL to the first node N1, the first level signal VGL may be a low level signal, and thus the first node N1 is set to be the low level. It should be understood that in other embodiments, the second input sub-circuit 12 may also be implemented by another circuit structure.

For example, the first control sub-circuit 20 may include a fifteenth transistor T15 and a sixteenth transistor T16, a control end of the fifteenth transistor T15 is connected to the clock signal terminal CLK, a first end of the fifteenth transistor T15 receives the first level signal VGL, a second end of the fifteenth transistor T15 is connected to a first end of the sixteenth transistor T16, and the fifteenth transistor T15 may transmit the first level signal VGL to the second end of the fifteenth transistor T15 in response to the signal of the clock signal terminal. A control end of the sixteenth transistor T16 is connected to the second node N2, the first end of the sixteenth transistor T16 is connected to the second end of the fifteenth transistor T15, and a second end of the sixteenth transistor T16 is connected to the first node N1. The sixteenth transistor T16 may transmit the received first level signal VGL to the first node N1 in response to the signal of the second node N2. The fifteenth transistor T15 and the sixteenth transistor T16 are of the same type of the transistor, and the fifteenth transistor T15 and the sixteenth transistor T16 may be of the same type as the transistor in the input circuit 10, that is, both are N-type transistors. The first level signal VGL may be a low level signal, in the signal maintenance stage after the shift register unit outputs the shift signal, the second node N2 is the high level, and the sixteenth transistor T16 is constantly turned-on. The clock signal terminal CLK periodically outputs the high level signal, such that the fifteenth transistor T15 is periodically turned on, and thus the fifteenth transistor T15 and the sixteenth transistor T16 may periodically transmit the received first level signal VGL to the first node N1, to periodically reset the first node N1 and control the first node N1 to be stabilized at a low level, and the low level of the first node N1 may control the first output sub-circuit 60 to be turned off. Thus, the problem of mis-output of the shift register unit caused by a rise in the potential of the first node N1 due to the current leakage of the first output sub-circuit 60 does not occur. Moreover, in the shift signal output stage, since the second node N2 is the low level, the sixteenth transistor T16 is turned off without affecting the first node N1, and that is, the signal output of the shift register unit at the signal output terminal is not affected. It should be understood that in other embodiments, the first control sub-circuit 20 may also have another circuit structure.

For example, the first output sub-circuit 60 may include a ninth N-type transistor T9 and a capacitor C, a control end of the ninth N-type transistor T9 is connected to the first node N1, a first end of the ninth N-type transistor T9 is connected to the clock signal terminal CLK, a second end of the ninth N-type transistor T9 is connected to the signal output terminal OUTPUT, and the ninth N-type transistor T9 may transmit the signal of the clock signal terminal to the signal output terminal OUTPUT in response to the signal of the first node N1; the capacitance C is provided with a first electrode connected to the first node N1, and a second electrode connected to the signal output terminal OUTPUT. In the shift signal output stage, the first node N1 is the high level, and the ninth N-type transistor T9 is turned on, when the clock signal terminal CLK is the high level, the high level signal is output through the ninth N-type transistor T9, and the shift register unit achieves the shift signal output. The capacitor C is connected to the control end and the second end of the ninth N-type transistor T9, which may stabilize the voltage of the control end of the ninth N-type transistor T9 and maintain the voltage stability of the control end of the ninth N-type transistor T9. It should be understood that in other exemplary embodiments, the first output sub-circuit 60 may also have another circuit structure.

It may be seen from the above analysis that in the exemplary embodiment of the present disclosure, the first input sub-circuit 11, the second input sub-circuit 12, the first control sub-circuit 20 and the first output sub-circuit 60 are all composed of N-type transistors, the first signal input terminal INPUT1 is the high level, the first input sub-circuit 11 may set the first node N1 to the high level, and the first node N1 controls the first output sub-circuit 60 to be turned on, the first output sub-circuit 60 outputs the high level signal of the clock signal terminal CLK, such that the shift register unit may achieve the shift signal output. When the second signal input terminal INPUT2 is the high level, the second input sub-circuit 12 is turned on, the first node N1 is set to the low level through the first level signal VGL, the first output sub-circuit 60 is turned off, and the shift register unit enters the signal maintenance stage. In the signal maintenance stage, the first control sub-circuit 20 uses the periodic signal of the clock signal terminal CLK to transmit the first level signal VGL to the first node N1 under the high level control of the first node N1, to periodically reset the first node N1, thereby controlling the first node N1 to always maintain the low level, and controlling the first output sub-circuit 60 to maintain the turned-off state to avoid its current leakage from causing the potential floating of the first node N1.

As shown in FIG. 1, in addition to the input circuit 10, the first output sub-circuit 60 and the first control sub-circuit 20, the shift register unit provided by the present disclosure may also include a second control sub-circuit 30, a third control sub-circuit 40, a fourth control sub-circuit 50 and a second output sub-circuit 70. Each functional module of the shift register unit of the present disclosure will be further described below with reference to the accompanying drawings.

In the exemplary embodiment, the second control sub-circuit 30 is connected to the fourth node N4 and the second node N2 and receives the first level signal VGL and a second level signal VGH1, the second control sub-circuit 30 may transmit the second level signal VGH1 to the fourth node N4 when the second node N2 is a non-turned-on level, or may transmit the first level signal VGL to the fourth node N4 in response to a turned-on level signal of the second node N2, and the first level signal VGL and the second level signal VGH1 have opposite polarities.

The third control sub-circuit 40 is connected to the first node N1, the second node N2, the first signal input terminal INPUT1 and receives the first level signal VGL, and the third control sub-circuit 40 may transmit the first level signal VGL to the second node N2 in response to the signal of the first signal input terminal INPUT1 and the signal of the first node N1.

The fourth control sub-circuit 50 is connected to the first node N1 and the second node N2 and receives the first level signal VGL and a third level signal VGH, the fourth control sub-circuit 50 may disconnect the third level signal VGH from the second node N2 in response to the signal of the first node N1 or transmit the third level signal VGH to the second node N2 in response to the third level signal VGH.

The second output sub-circuit 70 is connected to the second node N2, the signal output terminal OUTPUT and receives the first level signal VGL, and the second output sub-circuit 70 may transmit the first level signal VGL to the signal output terminal OUTPUT in response to the signal of the second node N2.

The first level signal VGL is a non-turned-on level signal, the second level signal VGH1 and the third level signal VGH are turned-on level signals, and signal amplitudes of the second level signal VGH1 and the third level signal VGH may be the same or different.

In the signal maintenance stage of the shift register, since the second node N2 always maintains the third level signal VGH, that is, the second node N2 is the turned-on level, it controls the second output sub-circuit 70 to be constantly turned on, and transmits the first level signal VGL to the signal output terminal OUTPUT, such that the shift register unit outputs a stable non-turned-on level signal in the signal maintenance stage.

In the shift signal output stage of the shift register, the second node N2 is the non-turned-on level. During the potential change of the fourth node N4, the second control sub-circuit 30 has a turned-on state to transmit the second level signal VGH1 to the fourth node N4, and the fourth node N4 is the turned-on level, by connecting a common connection end of the third N-type transistor T3 and the fourth N-type transistor T4 in the first input sub-circuit 11 to the fourth node N4, the turned-on level of the fourth node N4 may control the third N-type transistor T3 and the fourth N-type transistor T4 to maintain a relatively small potential difference, so as to avoid a threshold voltage drift of the third N-type transistor T3 and the fourth N-type transistor T4 in the shift signal output stage and affect the shift signal outputted.

Moreover, in the subsequent signal maintenance stage, the second control sub-circuit 30 transmits the first level signal VGL to the fourth node N4 under the control of the turned-on level of the second node N2, the fourth node N4 is the non-turned-on level, and meanwhile, the second control sub-circuit 30 may disconnect a communication path between the second level signal VGH1 and the fourth node, such that the fourth node N4 may maintain the non-turned-on level, which further ensures that the shift register unit may keep the operating state stable during the signal maintenance stage.

The fourth control sub-circuit 50 may be configured to control a potential of the second node N2. When the first node N1 is the turned-on level, the fourth control sub-circuit 50 may disconnect a communication path between the third level signal VGH and the second node N2, such that the second node N2 maintains the non-turned-on level. When the first node N1 is the non-turned-on level, the fourth control sub-circuit 50 may transmit the third level signal VGH to the second node N2, such that the second node N2 is set to be the turned-on level.

As shown in FIG. 1, in the exemplary embodiment, each of above functional units may be implemented through an N-type transistor.

For example, the second control sub-circuit 30 may include a fifth N-type transistor T5, a sixth N-type transistor T6 and a seventh N-type transistor T7, a control end of the seventh N-type transistor T7 is connected to the second node N2, a first end of the seventh N-type transistor T7 receives the first level signal VGL, a second end of the seventh N-type transistor T7 is connected to the fourth node N4, and the seventh N-type transistor T7 may transmit the first level signal VGL to the fourth node N4 in response to the signal of the second node N2. A control end of the sixth N-type transistor T6 is connected to the second node N2, a first end of the sixth N-type transistor T6 is connected to the fourth node N4, a second end of the sixth N-type transistor T6 is connected to a control end of the fifth N-type transistor T5, and the sixth N-type transistor T6 may output the signal of the fourth node N4 through the second end of the sixth N-type transistor in response to the signal of the second node N2. The control end of the fifth N-type transistor T5 is connected to the second end of the sixth N-type transistor T6, a first end of the fifth N-type transistor T5 receives the second level signal VGH1, a second end of the fifth N-type transistor T5 is connected to the fourth node N4, and the fifth N-type transistor T5 is configured to transmit the second level signal VGH1 to the fourth node N4 when the second node N2 is the non-turned-on level and stop transmitting the second level signal VGH1 to the fourth node N4 when the second node N2 is the turned-on level.

In the shift signal output stage of the shift register, the second node N2 is the low level, the sixth N-type transistor T6 and the seventh N-type transistor T7 are turned off, and the fifth N-type transistor T5 is in a floating state. With the change of a potential of the fourth node, the fifth N-type transistor T5 may output the second level signal VGH1 received at the first end through the second end, that is, the second level signal VGH1 is output to the fourth node N4. Since the common connection end of the third N-type transistor T3 and the fourth N-type transistor T4 are connected to the fourth node N4, the second level signal VGH1 obtained by the fourth node N4 may stabilize the first end of the third N-type transistor T3 and the second end of the fourth N-type transistor T4 as the second level signal VGH1, so as to avoid the threshold voltage drift problem of the third N-type transistor T3 and the fourth N-type transistor T4 due to the increased potential difference. In the signal maintenance stage, the sixth N-type transistor T6 and the seventh N-type transistor T7 are turned on under the control of the high level of the second node N2, the first level signal VGH1 is transmitted to the control end of the fifth N-type transistor T5 and the fourth node N4, and the fifth N-type transistor T5 is turned off under the control of the low-level first level signal VGH1, such that the second level signal VGH1 is not written to the fourth node N4. Thus, the second control sub-circuit 30 does not affect the output signal of the shift register during the signal maintenance stage. It should be understood that in other embodiments, the second control sub-circuit 30 may also be implemented by another circuit structure.

As shown in FIG. 1, in the exemplary embodiment, the third control sub-circuit 40 may include an eighth N-type transistor T8, and an eleventh N-type transistor T11, a control end of the eighth N-type transistor T8 is connected to the first signal input terminal INPUT1, a first end of the eighth N-type transistor T8 receives the first level signal VGL, a second end of the eighth N-type transistor T8 is connected to the second node N2, and the eighth N-type transistor T8 may transmit the first level signal VGL to the second node N2 in response to the signal of the first signal input terminal INPUT1, to reset the second node N2. A control end of the eleventh N-type transistor T11 is connected to the first node N1, a first end of the eleventh N-type transistor T11 receives the first level signal VGL, a second end of the eleventh N-type transistor T11 is connected to the second node N2, and the eleventh N-type transistor T11 may transmit the first level signal VGL to the second node N2 in response to the signal of the first node N1, to reset the second node N2. The control end of the eighth N-type transistor T8 is connected to the first signal input terminal INPUT1, when the first signal input terminal INPUT1 is the high level, the eighth N-type transistor T8 is turned on, and it may transmit the received first level signal VGL to the second node N2, thus rapidly pulling down the potential of the second node N2, and the potential of the fourth node N4 is changed, which in turn allows the potential of the first node N1 to be changed. It should be understood that in other embodiments, the third control sub-circuit 40 may also be implemented by another circuit structure.

As shown in FIG. 1, in the exemplary embodiment, the fourth control sub-circuit 50 may include: a twelfth N-type transistor T12, a thirteenth N-type transistor T13 and a fourteenth N-type transistor T14. A control end of the twelfth N-type transistor T12 is connected to the first node N1, a first end of the twelfth N-type transistor T12 receives the first level signal VGL, a second end of the twelfth N-type transistor T12 is connected to the third node N3, and the twelfth N-type transistor T12 may transmit the first level signal VGL to the third node N3 in response to the signal of the first node N1. A control end and a first end of the thirteenth N-type transistor T13 receive the third level signal VGH, a second end of the thirteenth N-type transistor T13 is connected to the third node N3, and the thirteenth N-type transistor T13 may transmit the third level signal VGH to the third node N3 in response to the third level signal VGH. A control end of the fourteenth N-type transistor T14 is connected to the third node N3, a first end of the fourteenth N-type transistor T14 receives the third level signal VGH, a second end of the fourteenth N-type transistor T14 is connected to the second node N2, and the fourteenth N-type transistor T14 may transmit the third level signal VGH to the second node N2 in response to a signal of the third node N3.

The control end of the twelfth N-type transistor T12 is connected to the first node N1, in the shift signal output stage, the first node N1 is the high level, the twelfth N-type transistor T12 is turned on, and the received first level signal VGL is transmitted to the third node N3, that is, the third node N3 is set to be the low level, the low level of the third node N3 controls the fourteenth N-type transistor T14 to be turned off, and the second node N2 maintains the low level. In the signal maintenance stage, the first node N1 is the low level, the twelfth N-type transistor T12 is turned off, and the potential of the third node N3 is slowly pulled up through the leakage of the thirteenth N-type transistor T13, thereby controlling that the fourteenth N-type transistor T14 is turned on, and the fourteenth N-type transistor T14 that is turned on transmits the high-level third level signal VGH to the second node N2, and that is, the second node N2 is set to be the high level. Moreover, during this signal maintenance stage, since the first node N1 is periodically reset, it is always maintained at the low level, so the third node N3 may always be kept at the high level, and the fourteenth N-type transistor T14 is maintained in the turned-on state, such that the second node N2 is stabilized at a high potential. It should be noted that the thirteenth N-type transistor T13 is in a leakage state as it is affected by the potential of the third node, when the twelfth N-type transistor T12 is turned on, it does not affect the potential of the third node N3. When the twelfth N-type transistor T12 is turned off, the leakage of the thirteenth N-type transistor T13 may pull up the potential of the third node N3.

As shown in FIG. 1, in the exemplary embodiment, the second output sub-circuit 70 may include a tenth N-type transistor, a control end of the tenth N-type transistor is connected to the second node N2, a first end of the tenth N-type transistor receives the first level signal VGL, a second end of the tenth N-type transistor is connected to the signal output terminal OUTPUT, and the tenth N-type transistor may transmit the first level signal VGL to the signal input terminal in response to the signal of the second node N2. In the shift signal output stage, since the second node N2 is the low level, the tenth N-type transistor is turned off, which does not affect the output. In the signal maintenance stage, since the second node N2 is the high level, the tenth N-type transistor is turned on, and the received first level signal VGL is transmitted to the signal output terminal OUTPUT, such that the shift register unit outputs the low level signal in the signal maintenance stage.

Figure 2:
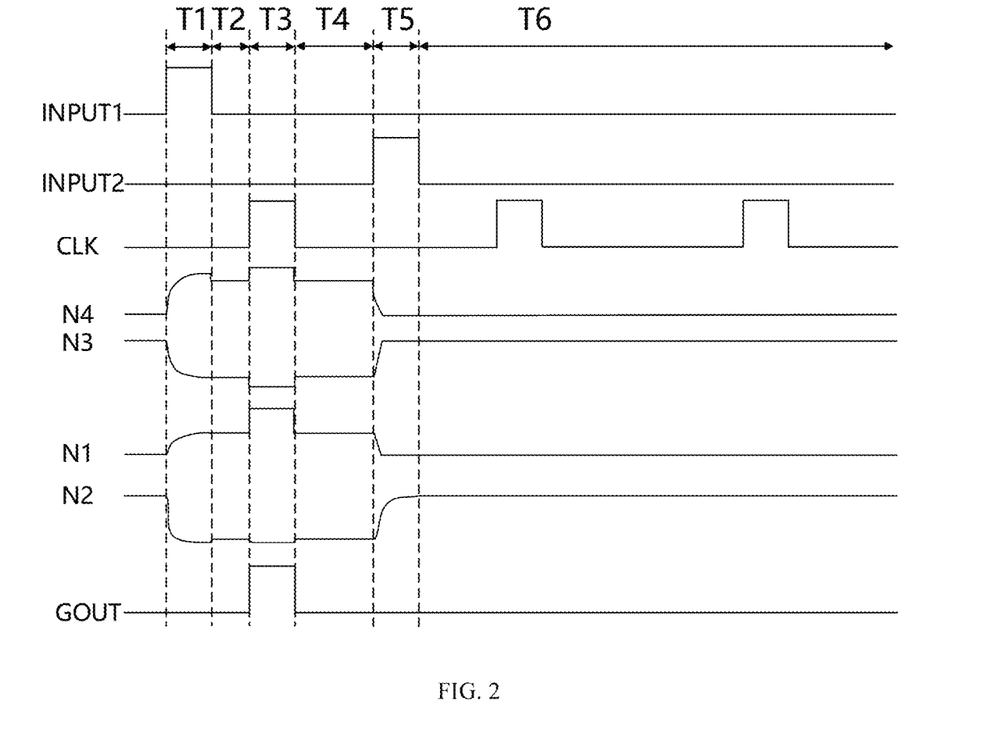
FIG. 2 is a timing diagram of some nodes in FIG. 1.

FIG. 2 is a timing diagram of some nodes in FIG. 1. A driving method of the shift register unit may include five stages, where the first level signal VGL is the low level signal, the second level signal VGH1 and the third level signal VGH are the high level signals, and the second level signal VGH1 and the third level signal VGH may be the same or different. The clock signal terminal CLK periodically outputs a high-level clock signal.

Figure 3:
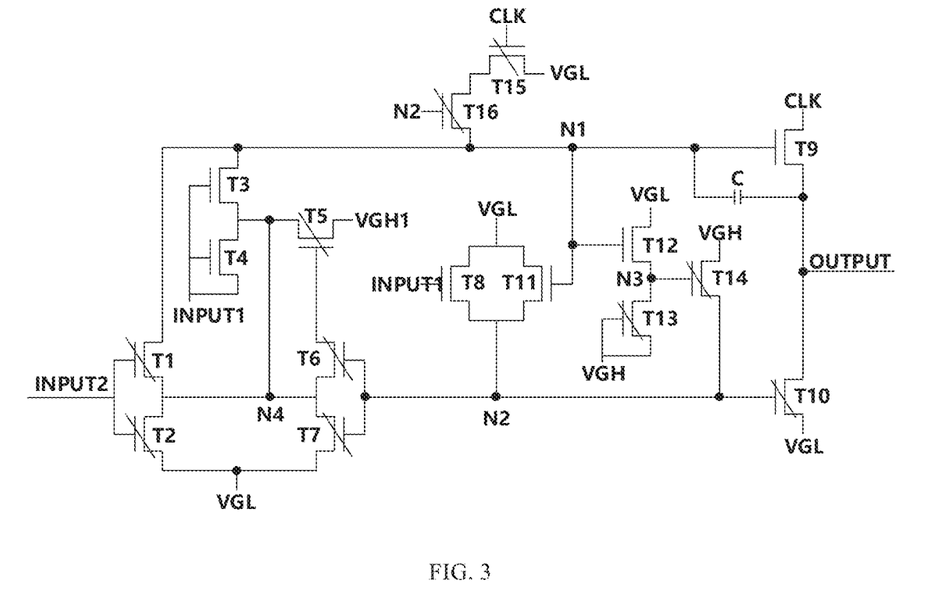
FIG. 3 is an equivalent circuit diagram of a shift register unit in a first stage according to an embodiment of the present disclosure.

In the first stage T1, the first signal input terminal INPUT1 is the high level signal, and the second signal input terminal INPUT2 is the low level signal. FIG. 3 is an equivalent circuit diagram of a shift register unit in a first stage according to an embodiment of the present disclosure. As shown in FIG. 3, the first signal input terminal INPUT1 is the high level signal, which controls the eighth N-type transistor T8 to be turned on, and the first level signal VGL is transmitted to the second node N2 and the second node N2 is quickly pulled down to the low level. The sixth N-type transistor T6 and the seventh N-type transistor T7 are turned off, and the fifth N-type transistor T5 is in the floating state. Before the potential of the fourth node N4 rises, the fifth N-type transistor T5 may transmit the second level signal VGH1 received at the first end to the fourth node N4, and under the influence of the potential of the fourth node N4, after the potential of the fourth node N4 rises, the VGS of the fifth N-type transistor T5 is less than zero, and the fifth N-type transistor T5 is turned off, the level of the fourth node N4 is less than the level of the first input signal provided by the first signal input terminal INPUT1, the fourth N-type transistor T4 is turned on, the third N-type transistor T3 is turned on under the control of the high level signal of the first signal input terminal INPUT1, and the first node N1 is set to be the high level. Under the control of the high level signal of the first node N1, the twelfth N-type transistor T12 is turned on, the first level signal VGL is transmitted to the third node N3, and the third node N3 is set to be the low level. The second signal input terminal INPUT2 is the low level, which controls the first N-type transistor T1 and the second N-type transistor T2 to be turned off.

Figure 4:
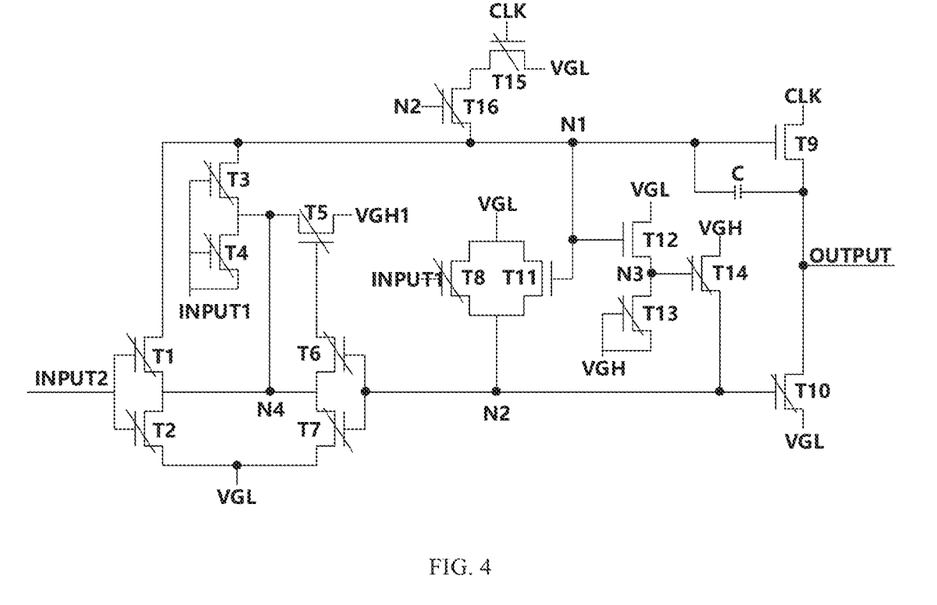
FIG. 4 is an equivalent circuit diagram of a shift register unit in a second stage according to an embodiment of the present disclosure.

In the second stage T2, both the first signal input terminal INPUT1 and the second signal input terminal INPUT2 are low level signals. FIG. 4 is an equivalent circuit diagram of a shift register unit in a second stage according to an embodiment of the present disclosure. As shown in FIG. 4, the first signal input terminal INPUT1 and the second signal input terminal INPUT2 are low level signals, the third N-type transistor T3, the fourth N-type transistor T4, the eighth N-type transistor T8, the first N-type transistor T1, and the second N-type transistor T2 are turned off. The first node N1 maintains the high level signal at the previous stage, and the eleventh N-type transistor T11, the twelfth N-type transistor T12, and the ninth N-type transistor T9 are turned on. The third node N3 is the low level, and the fourteenth N-type transistor T14 is turned off. The second node N2 maintains the low level, and the tenth N-type transistor T10 and the sixteenth N-type transistor T16 are turned off. The fourth node N4 maintains the high level.

Figure 5:
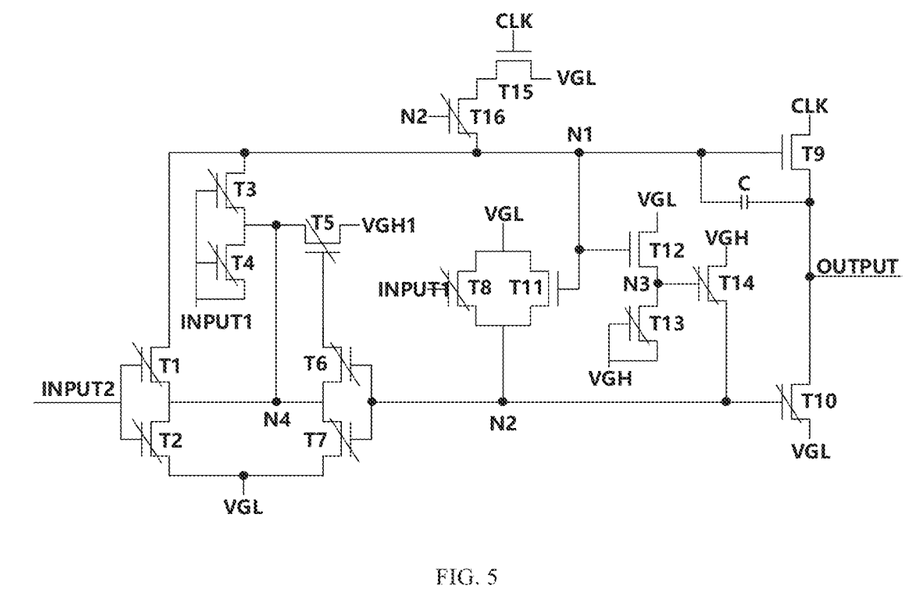
FIG. 5 is an equivalent circuit diagram of a shift register unit in a third stage according to an embodiment of the present disclosure.

In the third stage T3, both the first signal input terminal INPUT1 and the second signal input terminal INPUT2 are low level signals. FIG. 5 is an equivalent circuit diagram of a shift register unit in a third stage according to an embodiment of the present disclosure. As shown in FIG. 5, the first signal input terminal INPUT1 and the second signal input terminal INPUT2 are the low level signals, the fourth N-type transistor T4, the third N-type transistor T3, the eighth transistor, the first N-type transistor T1, and the second N-type transistor T2 are turned off. The first node N1 maintains the high level, and the ninth N-type transistor T9, the eleventh N-type transistor T11, and the twelfth N-type transistor T12 are turned on. The second node N2 is the low level, and the sixth N-type transistor T6, the seventh N-type transistor T7, the fifth N-type transistor T5, the tenth N-type transistor and the sixteenth N-type transistor T16 are turned off. The third node N3 is the low level, and the fourteenth N-type transistor T14 is turned off. The clock signal terminal CLK outputs the high level signal, each of the fifteenth transistor T15 and the ninth N-type transistor T9 is turned on, the ninth N-type transistor T9 transmits the high-level clock signal to the signal output terminal OUTPUT, and the signal output terminal OUTPUT outputs the high level signal, such that the output signal of the shift register unit is shifted compared to the input signal. At this stage, since clock signal terminal CLK outputs the high level signal, the potential of the first node N1 further increases under the bootstrap effect of the capacitor C.

Figure 6:
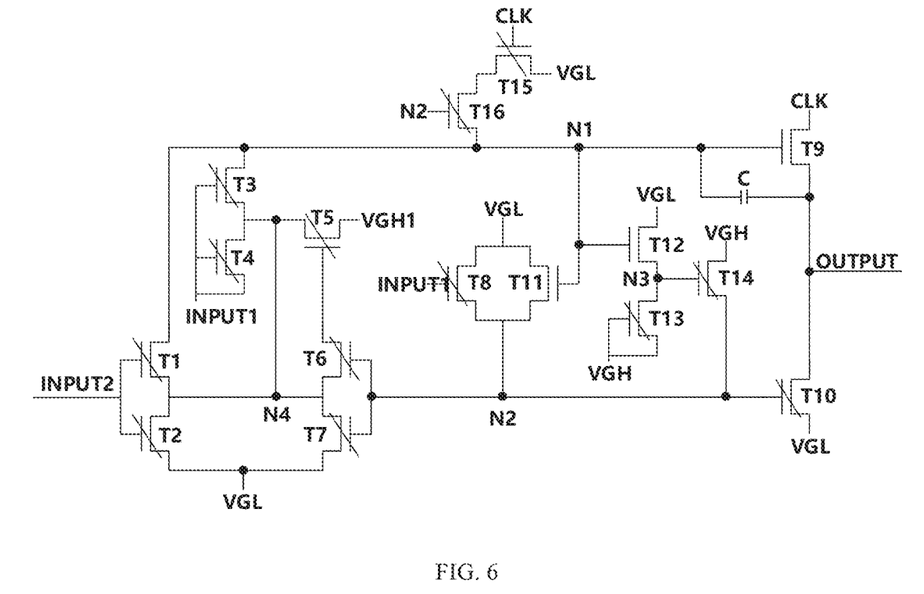
FIG. 6 is an equivalent circuit diagram of a shift register unit in a fourth stage according to an embodiment of the present disclosure.

In the fourth stage T4, the first signal input terminal INPUT1 is the low level signal. FIG. 6 is an equivalent circuit diagram of a shift register unit in a fourth stage according to an embodiment of the present disclosure. As shown in FIG. 6, the first signal input terminal INPUT1 and the second signal input terminal INPUT2 are low level signals, and the fourth N-type transistor T4, the third N-type transistor T3, the eighth transistor, the first N-type transistor T1 and the second N-type transistor T2 are turned off. The first node N1 maintains the high level, and the ninth N-type transistor T9, the eleventh N-type transistor T11, and the twelfth N-type transistor T12 are turned on. The second node N2 is the low level, and the sixth N-type transistor T6, the seventh N-type transistor T7, the fifth N-type transistor T5, the tenth N-type transistor and the sixteenth N-type transistor T16 are turned off. The third node N3 is the low level, and the fourteenth N-type transistor T14 is turned off. The fourth node N4 maintains the high level. The clock signal terminal CLK outputs the low level signal, and the ninth N-type transistor T9 transmits the low level signal of the clock signal terminal CLK to the signal output terminal OUTPUT, such that the shift register unit outputs the low level signal, and the shift register unit completes the shift signal output.

Figure 7:
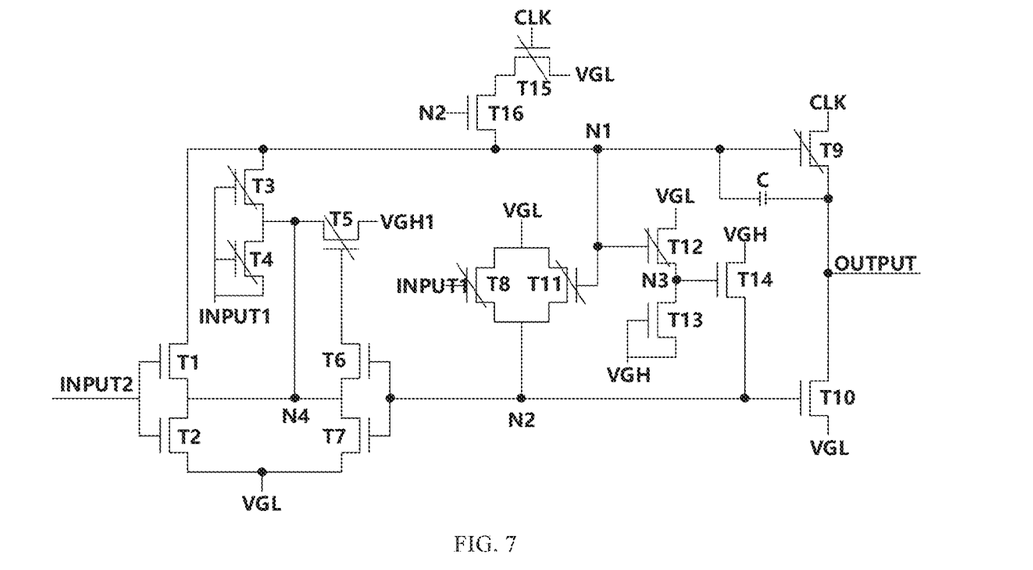
FIG. 7 is an equivalent circuit diagram of a shift register unit in a fifth stage according to an embodiment of the present disclosure.

In the fifth stage T5, the first signal input terminal INPUT1 is a low level signal, and the second signal input terminal INPUT2 is a high level signal. FIG. 7 is an equivalent circuit diagram of a shift register unit in a fifth stage according to an embodiment of the present disclosure. As shown in FIG. 7, the first signal input terminal INPUT1 is a low level signal, and the fourth N-type transistor T4, the third N-type transistor T3, and the eighth transistor are turned off. The second signal input terminal INPUT2 is the high level, causing the second N-type transistor T2 and the first N-type transistor T1 to be turned on, such that the first level signal VGL received by the second N-type transistor T2 is transmitted to the first node N1, and the first node N1 is set to be the low level. The first node N1 is the low level, the ninth N-type transistor T9, the eleventh N-type transistor T11, and the twelfth N-type transistor T12 are turned off, the thirteenth N-type transistor T13 leaks current to the third node N3, and the potential of the third node N3 gradually increases until it becomes the high level. Under the control of the high level signal of the third node N3, the fourteenth N-type transistor T14 is turned on, the received third level signal VGH is transmitted to the second node N2, and the second node N2 is set to be the high level. The second node N2 is the high level, the sixth N-type transistor T6, the seventh N-type transistor T7, and the tenth N-type transistor T10 are turned on, the seventh N-type transistor T7 and the sixth N-type transistor T6 are turned on, and the first level signal VGL received by the seventh N-type transistor T7 is transmitted to the fourth node N4, the fourth node N4 is set to be the low level, the fifth N-type transistor T5 is turned off, and the fourth node N4 is stabilized at the low level. The tenth N-type transistor is turned on to transmit the first level signal VGL to the signal output terminal OUTPUT, the shift register unit outputs a stable low level signal, and the shift register enters the signal maintenance stage.

Thereafter, as shown in FIG. 2, the shift register unit enters the signal maintenance stage T6, and the second node N2 maintains a high potential, which controls the sixteenth transistor T16 to be turned on, and the clock signal terminal CLK periodically outputs a high level signal, thus controlling the fifteenth transistor T15 to be periodically turned on, and periodically transmitting the received first level signal VGL to the first node N1, so as to achieve the periodic reset of the first node N1, such that the first node N1 always maintains the low level, the ninth N-type transistor N9 is always turned off, and there is no current leakage problem. Thus, the shift register unit provided by the present disclosure may keep the potential of the first node N1 stable during the signal maintenance stage T6, such that the shift register may output a stable low level signal in the signal maintenance stage.

In addition, during the signal maintenance stage T6, since the first node N1 is a stable low potential, the ninth N-type transistor T9 is turned off, and there is no current leakage problem. The first node N1 maintains a stable low potential, so the twelfth N-type transistor T12 maintains the turned-off state, and the twelfth N-type transistor T12 does not transmit the low-level first level signal VGL to the third node N3, and thus the third node N3 does not have a short circuit problem between the low level and the high level.

It should be noted that in the T1-T5 stage, since the second node N2 is the low potential, the sixth N-type transistor T6 and the seventh N-type transistor T7 are turned off, and the fifth N-type transistor T5 is in the floating state. With the potential change of the fourth node N4, the VGS of the fifth N-type transistor T5 changes, such that the fifth N-type transistor T5 has the turned-on state and current leakage state, and the second level signal VGH1 is transmitted to the fourth node N4, to protect a potential difference between the first N-type transistor T1 and the second N-type transistor T2 and a potential difference between the third N-type transistor T3 and the fourth N-type transistor T4, to avoid the threshold drift of the first N-type transistor T1 and the second N-type transistor T2, and to avoid the threshold drift of the third N-type transistor T3 and the fourth N-type transistor T4.

In the exemplary embodiment, the first signal input terminal INPUT1 is configured to output the high-level first input signal, and the second signal input terminal INPUT2 is configured to output the high-level second input signal. A signal period of the clock signal of the clock signal terminal CLK may be less than or equal to a time interval between the first input signal and the second input signal, and that is, there are two or more high-level clock signals between the first input signal and the second input signal. Thus, the shift register unit provided by the present disclosure may output two or more shift signals during the shift signal output stage, and by applying the shift register unit to TV, a multi-GSTV function may be achieved.

In an exemplary embodiment, a plurality of the shift register units described above may be cascaded to form a gate drive circuit of the display panel. An input terminal of each stage is connected to an output terminal of a previous stage, and that is, an output signal of the previous stage is used as an input signal of a present stage. The output terminal of each stage is connected to a reset signal terminal RESET of the previous stage, and that is, an output signal of the present stage is used as a reset signal of the previous stage. Through the cascaded gate drive circuit, the display panel sequentially turns on scanning lines of each row and turns off scanning lines of other rows under the driving of each signal, thereby driving only a TFT corresponding to the pixel unit of the row to achieve progressive scanning. The gate drive circuit provided by the exemplary embodiment may be integrated on the array substrate to form a GOA unit.

The present disclosure also provides a display panel, which includes a gate drive circuit, and the gate drive circuit includes a plurality of shift register units that are cascaded. The display panel may be applied to a product or a component with any display function, such as a liquid crystal display panel, an electronic paper, an OLED panel, a liquid crystal display TV, a liquid crystal display, a digital photo frame, a mobile phone, a tablet computer.

Those skilled in the art will easily think of other embodiments of the present disclosure after considering the specification and practicing the invention disclosed herein. The present disclosure is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and embodiments are only regarded as exemplary, and the true scope and spirit of the present disclosure are defined by the appended claims.

What is claimed is:

1. A shift register unit, comprising:
an input circuit, connected to a first signal input terminal, a second signal input terminal and a first node and receiving a first level signal, wherein the input circuit is configured to transmit a signal of the first signal input terminal to the first node in response to the signal of the first signal input terminal and transmit the first level signal to the first node in response to a signal of the second signal input terminal;
a first control sub-circuit, connected to the first node, a second node and a clock signal terminal and receiving the first level signal, wherein the first control sub-circuit is configured to periodically transmit the received first level signal to the first node in response to a turned-on signal of the second node and a periodic clock signal of the clock signal terminal;
a first output sub-circuit, connected to the first node, the clock signal terminal and a signal output terminal, wherein the first output sub-circuit is configured to transmit the signal of the clock signal terminal to the signal output terminal in response to a signal of the first node.

2. The shift register unit according to claim 1, wherein a level signal of the first node and a level signal of the second node are inverted in phase, and a turned-on level of the first output sub-circuit and a turned-on level of the first control sub-circuit have the same polarity.

3. The shift register unit according to claim 2, wherein the first level signal and a turned-on level signal of the first output sub-circuit have opposite polarities.

4. The shift register unit according to claim 1, wherein the signal of the clock signal terminal is a periodic signal, the first signal input terminal is configured to provide a first input signal, the second signal input terminal is configured to provide a second input signal, and a signal period of the clock signal terminal is less than or equal to a time interval between the first input signal and the second input signal.

5. The shift register unit according to claim 2, wherein the first control sub-circuit comprises:

a fifteenth transistor, with a control end connected to the clock signal terminal and a first end receiving the first level signal, wherein the fifteenth transistor is configured to transmit the first level signal to a second end of the fifteenth transistor in response to the signal of the clock signal terminal;

a sixteenth transistor, with a control end connected to the second node, a first end connected to the second end of the fifteenth transistor, and a second end connected to the first node, wherein the sixteenth transistor is configured to transmit the received first level signal to the first node in response to the signal of the second node.

6. The shift register unit according to claim 5, wherein turned-on levels of the fifteenth transistor and the sixteenth transistor have the same polarity.

7. The shift register unit according to claim 6, wherein the fifteenth transistor and the sixteenth transistor are both N-type transistors.

8. The shift register unit according to claim 2, wherein the first output sub-circuit comprises:
a ninth N-type transistor, with a control end connected to the first node, a first end connected to the clock signal terminal, and a second end connected to the signal output terminal, wherein the ninth N-type transistor is configured to transmit the signal of the clock signal terminal to the signal output terminal in response to the signal of the first node;
a capacitor, with a first electrode connected to the first node, and a second electrode connected to the signal output terminal.

9. The shift register unit according to claim 1, wherein the input circuit comprises:
a first input sub-circuit, connected to the first signal input terminal and the first node, wherein the first input sub-circuit is configured to transmit the signal of the first signal input terminal to the first node in response to the signal of the first signal input terminal;
a second input sub-circuit, connected to a second signal terminal and the first node and receiving the first level signal, wherein the second input sub-circuit is configured to transmit the first level signal to the first node in response to a signal of the second signal terminal.

10. The shift register unit according to claim 9, wherein the first input sub-circuit comprises:
a fourth N-type transistor, with a control end and a first end connected to the first signal input terminal, and a second end connected to a fourth node, wherein the fourth N-type transistor is configured to transmit the signal of the first signal input terminal to the fourth node in response to the signal of the first signal input terminal;
a third N-type transistor, with a control end connected to the first signal input terminal, a first end connected to the fourth node, and a second end connected to the first node, wherein the third N-type transistor is configured to transmit a signal of the fourth node to the first node in response to the signal of the first signal input terminal;
the second input sub-circuit comprises:
a second N-type transistor, with a control end connected to the second signal input terminal, a first end receiving the first level signal, and a second end connected to the fourth node, wherein the second N-type transistor is configured to transmit the first level signal to the fourth node in response to the signal of the second signal input terminal;

a first N-type transistor, with a control end connected to the second signal input terminal, a first end connected to the fourth node, and a second end connected to the first node, wherein the first N-type transistor is configured to transmit the signal of the fourth node to the first node in response to the signal of the second signal input terminal.

11. The shift register unit according to claim 1, further comprising:
a second control sub-circuit, connected to the fourth node and the second node and receiving the first level signal and a second level signal, wherein the second control sub-circuit is configured to transmit the second level signal to the fourth node when the second node is a non-turned-on level or transmit the first level signal to the fourth node in response to a turned-on level signal of the second node;
wherein the first level signal and the second level signal have opposite polarities.

12. The shift register unit according to claim 11, wherein the second control sub-circuit comprises:
a seventh N-type transistor, with a control end connected to the second node, a first end receiving the first level signal, and a second end connected to the fourth node, wherein the seventh N-type transistor is configured to transmit the first level signal to the fourth node in response to the signal of the second node;
a sixth N-type transistor, with a control end connected to the second node and a first end connected to the fourth node, wherein the sixth N-type transistor is configured to output the signal of the fourth node through a second end of the sixth N-type transistor in response to the signal of the second node;
a fifth N-type transistor, with a control end connected to the second end of the sixth N-type transistor, a first end receiving the second level signal, and a second end connected to the fourth node, wherein the fifth N-type transistor is configured to transmit the second level signal to the fourth node when the second node is the non-turned-on level, and stop transmitting the second level signal to the fourth node when the second node is the turned-on level signal.

13. The shift register unit according to claim 1, further comprising:
a third control sub-circuit, connected to the first node, the second node, the first signal input terminal and receiving the first level signal, wherein the third control sub-circuit is configured to transmit the first level signal to the second node in response to the signal of the first signal input terminal and the signal of the first node;
a fourth control sub-circuit, connected to the first node and the second node and receiving the first level signal and a third level signal, wherein the fourth control sub-circuit is configured to disconnect the third level signal from the second node in response to the signal of the first node or transmit the third level signal to the second node in response to the third level signal, wherein the third level signal and the first level signal are inverted in phase.

14. The shift register unit according to claim 13, wherein the third control sub-circuit comprises:
an eighth N-type transistor, with a control end connected to the first signal input terminal, a first end receiving the first level signal, and a second end connected to the second node, wherein the eighth N-type transistor is configured to transmit the first level signal to the second node in response to the signal of the first signal input terminal, to reset the second node;

an eleventh N-type transistor, with a control end connected to the first node, a first end receiving the first level signal, and a second end connected to the second node, wherein the eleventh N-type transistor is configured to transmit the first level signal to the second node in response to the signal of the first node, to reset the second node;

the fourth control sub-circuit comprises:

a twelfth N-type transistor, with a control end connected to the first node, a first end receiving the first level signal, a second end connected to a third node, wherein the twelfth N-type transistor is configured to transmit the first level signal to the third node in response to the signal of the first node;

a thirteenth N-type transistor, with a control end and a first end receiving the third level signal, and a second end connected to the third node, wherein the thirteenth N-type transistor is configured to transmit the third level signal to the third node in response to the third level signal;

a fourteenth N-type transistor, with a control end connected to the third node, a first end receiving the third level signal and a second end connected to the second node, wherein the fourteenth N-type transistor is configured to transmit the third level signal to the second node in response to a signal of the third node.

15. The shift register unit according to claim 1, further comprising:

a second output sub-circuit, connected to the second node, the signal output terminal and receiving the first level signal, wherein the second output sub-circuit is configured to transmit the first level signal to the signal output terminal in response to the signal of the second node.

16. The shift register unit according to claim 15, wherein the second output sub-circuit comprises:

a tenth N-type transistor, with a control end connected to the second node, a first end receiving the first level signal, and a second end connected to the signal output terminal, wherein the tenth N-type transistor is configured to transmit the first level signal to the signal input terminal in response to the signal of the second node.

17. A display panel, comprising a gate drive circuit, wherein the gate drive circuit comprises a plurality of shift register units cascaded, wherein the shift register unit comprises:

an input circuit, connected to a first signal input terminal, a second signal input terminal and a first node and receiving a first level signal, wherein the input circuit is configured to transmit a signal of the first signal input terminal to the first node in response to the signal of the first signal input terminal and transmit the first level signal to the first node in response to a signal of the second signal input terminal;

a first control sub-circuit, connected to the first node, a second node and a clock signal terminal and receiving the first level signal, wherein the first control sub-circuit is configured to periodically transmit the received first level signal to the first node in response to a turned-on signal of the second node and a periodic clock signal of the clock signal terminal;

a first output sub-circuit, connected to the first node, the clock signal terminal and a signal output terminal, wherein the first output sub-circuit is configured to transmit the signal of the clock signal terminal to the signal output terminal in response to a signal of the first node.

18. The display panel according to claim 17, wherein a level signal of the first node and a level signal of the second node are inverted in phase, and a turned-on level of the first output sub-circuit and a turned-on level of the first control sub-circuit have the same polarity.

19. The display panel according to claim 18, wherein the first level signal and a turned-on level signal of the first output sub-circuit have opposite polarities.

20. The display panel according to claim 17, wherein the signal of the clock signal terminal is a periodic signal, the first signal input terminal is configured to provide a first input signal, the second signal input terminal is configured to provide a second input signal, and a signal period of the clock signal terminal is less than or equal to a time interval between the first input signal and the second input signal.

* * * * *